US012811436B2

(12) United States Patent
Abbate

(10) Patent No.: US 12,811,436 B2
(45) Date of Patent: Nov. 24, 2026

(54) CIRCUIT ARRANGEMENT FOR EXTRACTING ENERGY FROM AN ENERGY HARVESTER

(71) Applicant: ETA SA Manufacture Horlogère Suisse, Grenchen (CH)

(72) Inventor: Francesco Abbate, Bienne (CH)

(73) Assignee: ETA SA MANUFACTURE HORLOGÈRE SUISSE, Grenchen (CH)

(*) Notice: Subject to any disclaimer, the term of this patent is extended or adjusted under 35 U.S.C. 154(b) by 0 days.

(21) Appl. No.: 18/930,128

(22) Filed: Oct. 29, 2024

(65) Prior Publication Data

US 2025/0183711 A1 Jun. 5, 2025

(30) Foreign Application Priority Data

Dec. 1, 2023 (EP) .................................... 23213704

(51) Int. Cl.
*H02J 50/00* (2016.01)
*G04G 19/10* (2006.01)
(Continued)

(52) U.S. Cl.
CPC ............ *H02J 50/001* (2020.01); *G04G 19/10* (2013.01); *H02J 7/345* (2013.01); *H02J 7/855* (2026.01); *H02J 7/933* (2026.01); *H02J 2207/50* (2020.01)

(58) Field of Classification Search
CPC .......... H02J 50/001; H02J 50/20; G04C 10/00
See application file for complete search history.

(56) References Cited

U.S. PATENT DOCUMENTS

| | | | | |
|---|---|---|---|---|
| 6,362,611 B1 | 3/2002 | Utsunomiya | | |
| 2015/0097439 A1* | 4/2015 | Kohout | H02J 50/12 | 307/104 |

(Continued)

FOREIGN PATENT DOCUMENTS

| | | | |
|---|---|---|---|
| JP | 2000-134812 A | 5/2000 |
| JP | 2019-103305 A | 6/2019 |
| KR | 10-2022-0138198 A | 10/2022 |

OTHER PUBLICATIONS

Communication dated Nov. 4, 2025 in Japanese Application No. 2024-190530.

*Primary Examiner* — Rexford N Barnie
*Assistant Examiner* — Joseph N Inge
(74) *Attorney, Agent, or Firm* — Sughrue Mion, PLLC

(57) ABSTRACT

A circuit arrangement (1) for extracting energy from an energy harvester (2). The circuit arrangement (1) includes: an integrated circuit (3) connected to the energy harvester (2) and configured to extract energy from the energy harvester; an energy accumulator (4) connected to the integrated circuit for receiving the energy extracted by the integrated circuit; a switch (5) arranged between the integrated circuit and the accumulator to selectively disconnect the accumulator from the integrated circuit (3). The integrated circuit (3) is configured to output a control signal, which as inverted or non-inverted is configured to close the switch (5) when the integrated circuit is able to extract energy from the energy harvester (2), and to open the switch when the integrated circuit (3) is unable to extract energy from the energy harvester (2) to thereby disconnect the integrated circuit from the accumulator (4).

16 Claims, 2 Drawing Sheets

(51) Int. Cl.

| | |
|---|---|
| ***H02J 7/00*** | (2026.01) |
| ***H02J 7/34*** | (2006.01) |
| ***H02J 7/90*** | (2026.01) |

(56) References Cited

U.S. PATENT DOCUMENTS

| | | | | |
|---|---|---|---|---|
| 2016/0079805 | A1* | 3/2016 | Reynolds | H02J 50/001 307/80 |
| 2017/0279276 | A1* | 9/2017 | Amin | H02J 3/38 |
| 2019/0171266 | A1 | 6/2019 | Gao et al. | |
| 2021/0075248 | A1* | 3/2021 | De Vos | H02M 1/36 |
| 2023/0024118 | A1* | 1/2023 | De Vos | H02J 7/345 |
| 2023/0208188 | A1* | 6/2023 | Xu | H02J 50/001 307/104 |

* cited by examiner

CIRCUIT ARRANGEMENT FOR EXTRACTING ENERGY FROM AN ENERGY HARVESTER

CROSS REFERENCE TO RELATED APPLICATIONS

This application claims priority to European Patent Application No. 23213704.2 filed Dec. 1, 2023, the entire contents of which are incorporated herein by reference.

TECHNICAL FIELD

The present invention relates to a circuit arrangement to be used in an energy harvesting system for reducing energy consumption in the energy harvesting system. The invention also relates to a method of operating the circuit arrangement for extracting energy from an energy harvester to charge an accumulator of the energy harvesting system.

BACKGROUND OF THE INVENTION

In the era of ubiquitous computing and the ever-growing demand for portable electronic devices, energy harvesting has emerged as a key technology for providing sustainable power sources. Energy harvesters harness ambient energy from the environment, such as solar radiation, vibrations, or thermal gradients, and convert it into electrical power. Despite the promise of energy harvesting, the efficiency of power extraction remains a critical concern.

When applied to watches, the advantage of energy harvesters is that they can reduce or eliminate the need for battery replacements in watches, making them more sustainable and environmentally friendly. However, the amount of energy that can be harvested depends on factors such as the type of harvester, the environmental conditions, and the watch's power requirements. As technology advances, we may see more watches and other electronic devices incorporating energy harvesting technologies.

One significant hurdle in optimising energy harvesting systems is the energy consumption of integrated circuits (ICs) responsible for extracting and managing the harvested energy. These ICs play a crucial role in making energy harvesting systems practical and efficient, especially in applications like wearable devices where space and power constraints are significant considerations. The development of specialised energy harvesting ICs has contributed to the advancement of self-powered and energy-efficient electronic devices. Traditional approaches for ICs often neglect the important aspect of minimising the power requirements of these circuits, leading to inefficiencies that compromise the overall effectiveness of energy harvesting systems. Excessive energy consumption not only diminishes the net energy gain but also imposes constraints on the feasibility of deploying energy harvesters in resource-constrained applications. In systems that use a dedicated integrated circuit for external energy harvesting functions, this integrated circuit constantly consumes energy even in the absence of external energy. This reduces the autonomy of the system and power reserve of the system because the integrated circuit is powered by an energy accumulator, such as a battery, of the system.

SUMMARY OF THE INVENTION

An object of the present invention is to overcome the above shortcomings relating to integrated circuits used to extract energy from energy harvesters. The present invention thus focuses on overcoming the energy consumption bottleneck by proposing an electronic circuit arrangement, which may also be referred to as a circuitry or electronic circuitry, specifically engineered to be exceptionally energy-efficient in the context of energy extraction from harvesters. The proposed circuit arrangement is designed to operate with minimal power overhead, ensuring that the energy consumed by the integrated circuit is significantly lower compared to conventional circuitry.

According to a first aspect of the invention, there is provided a circuit arrangement for extracting energy from an energy harvester as recited in claim 1.

The present invention has the advantage that if offers increased autonomy and power reserve of the system, where the circuit arrangement is used, while maintaining the ability to harvest energy from an external source optimally using the integrated circuit of the circuit arrangement. Furthermore, the circuit arrangement not only maximises the net energy available for consumption but also extends the operational lifetime of energy harvesting systems, making them more practical and sustainable across a broad spectrum of applications.

According to a second aspect of the invention, there is provided a method of operating a circuit arrangement for extracting energy from an energy harvester as recited in claim 14.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF THE INVENTION

Figure 1:
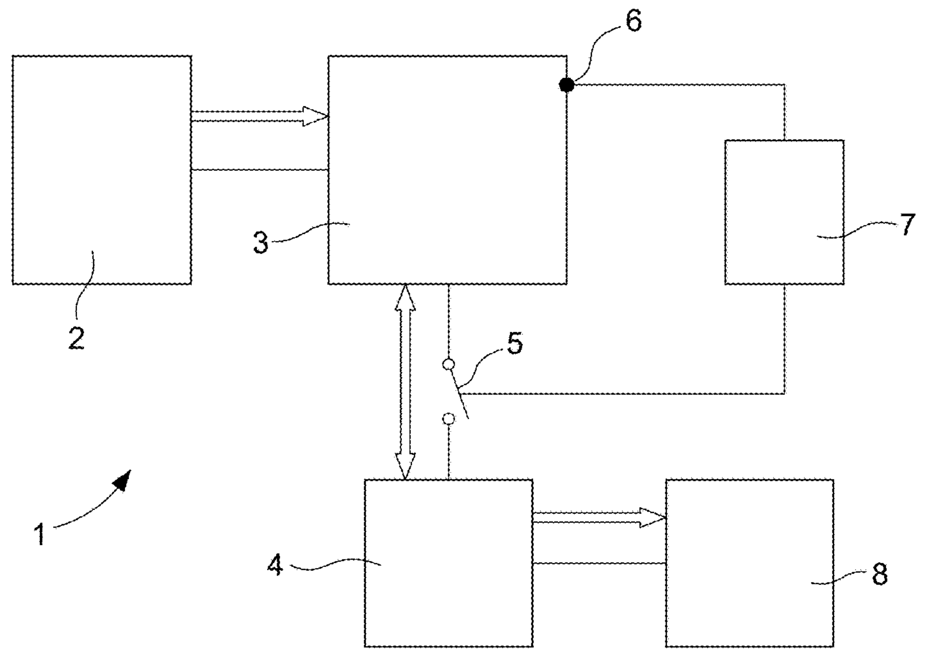
FIG. 1 is a block diagram showing an energy harvesting system according to an example embodiment of the present invention.

An embodiment of the present invention will next be described in detail with reference to the attached figures. The invention will be described in the context of an energy harvesting system of a timepiece, such as a watch. However, the teachings of the invention are not limited to this environment or application. Identical or corresponding functional and structural elements which appear in different drawings are assigned the same reference numerals. As utilised herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." Furthermore, the term "comprise" is used herein as an open-ended term. This means that the object encompasses all the elements listed, but may also include additional, unnamed elements. Thus, the word “comprise” is interpreted by the broader meaning “include”, “contain” or “comprehend”.

FIG. 1 is a block diagram showing an example energy harvesting system 1 according to the present invention. The arrows in FIG. 1 indicate the direction of the energy flow. The energy harvesting system comprises an energy source or harvester 2. An energy harvester for a watch is a device that captures and converts ambient energy from the environment into electrical power to supply energy to the watch. Traditional watches often use batteries for power, but energy harvesters provide an alternative or supplementary source of energy. One or more types of energy harvesters may be used, optionally in combination, and they can utilise different sources of ambient energy, including:

- Solar cells: Watches equipped with solar cells can convert light energy, typically from the sun, into electrical power. The solar cells are usually integrated into the watch face.
- Kinetic or mechanical energy harvesters: These devices convert motion or kinetic energy into electrical power. For watches, this often involves the use of a rotor that spins with the movement of the wearer’s wrist, generating electrical energy.
- Thermoelectric generators: These harvesters convert temperature differences into electrical power. The temperature gradient between the wearer’s body and the surrounding environment can be used to generate energy.
- Radio frequency (RF) harvesters: RF harvesters capture energy from ambient radio frequency signals. This technology is still in the early stages but has the potential to be used in small electronic devices like watches.

The energy harvester 2 is connected to an energy harvester IC 3, which is a component that is designed to extract energy from the energy harvester, and to manage and optimise this operation and the subsequent processing of the extracted energy. An IC is an assembly of electronic components in which typically hundreds to millions of transistors, resistors, and capacitors are interconnected and built up on a thin substrate of semiconductor material (usually silicon) to form a small chip or wafer. It is to be noted that in the present description the expression “operably coupled” may be used synonymously with the word “connected”. The primary function of the IC 3 is to efficiently convert and regulate the harvested energy to charge an energy accumulator 4. Features and functions of the IC 3 may include one or more of the following:

- Energy harvesting control: The IC monitors the output of an energy transducer (e.g., voltage from the energy harvester) and controls the harvesting process to maximise efficiency.
- Power management: The IC manages the power generated by the energy harvester, ensuring that it is delivered to the accumulator 4 in a stable and regulated manner. It may include voltage regulation, current limiting, and other power management features.
- Energy storage interface: The IC facilitates the charging of the accumulator 4, which may be a rechargeable battery or a capacitor.
- Low power operation: Since energy harvesting applications often involve small amounts of available power, the IC is designed to operate efficiently at low power levels. This may include a zero-power or substantially zero-power sleep mode.
- Adaptive power control: The IC may have adaptive power control features, adjusting the power delivery based on the energy availability and the power requirements of components of the energy harvesting system.
- Energy monitoring and reporting: The IC may include features for monitoring and reporting the energy harvesting performance. This information can be valuable for optimising the design and understanding the device’s energy budget.

The energy harvesting system 1 comprises the accumulator 4, which is an energy storage element. An accumulator in the context of a watch is thus a component used for energy storage. The accumulator may for instance be a rechargeable battery, such as a lithium-ion or lithium-polymer battery. The accumulator may alternatively, or in addition, be a supercapacitor, also called an ultracapacitor, which is a high-capacity capacitor, with a capacitance value much higher than solid-state capacitors but with lower voltage limits. It bridges the gap between electrolytic capacitors and rechargeable batteries. It typically stores 10 to 100 times more energy per unit volume or mass than electrolytic capacitors, can accept and deliver charge much faster than batteries, and tolerates many more charge and discharge cycles than rechargeable batteries. The accumulator 4 thus serves as a reservoir for storing the harvested energy. The energy production from the energy harvester may not be constant or may not align with the immediate power needs of the watch. The accumulator allows the watch to store excess energy during periods of abundance and release it when needed to power the watch’s electronic components.

According to the present invention, the accumulator 4 is connected to the IC 3 through a switch 5, which is configured to be selectively closed or opened based on the ability of the IC 3 to extract energy from the energy harvester 2. More specifically, the IC 3 is configured to output a control signal, which may also be referred to as an energy signal, and which as inverted or non-inverted is used to control the operation of the switch. In other words, the control signal is used to control the electrical conductivity of the switch. The control signal (or its absence) is arranged to disconnect the IC 3 from the accumulator 4 if the energy harvester is not able to harvest energy. In other words, the switch 5 is open, i.e., electrically non-conductive, if the IC is unable to extract energy from the energy harvester 2. The switch 5 is closed, i.e., it becomes electrically conductive to allow the IC to charge the accumulator as soon as the energy harvester is able to harvest energy, or as soon as the IC is able to extract energy from the energy harvester 2. When the IC 3 is disconnected from the accumulator 4, it no longer consumes energy, or its energy consumption is substantially negligent. When the IC is connected to the accumulator, the consumption of the IC is covered by the energy extracted from the harvester, and any excess energy is used to charge the accumulator. It is to be noted that instead of there being just one switch between the IC 3 and the accumulator 4, there could be provided a plurality of switches forming a switch system. In this case, these switches would be operated in a controlled manner to collectively disconnect the IC from the accumulator, or to collectively connect the IC 3 to the accumulator 4 based on one or more control signals from the IC 3.

Figure 2:
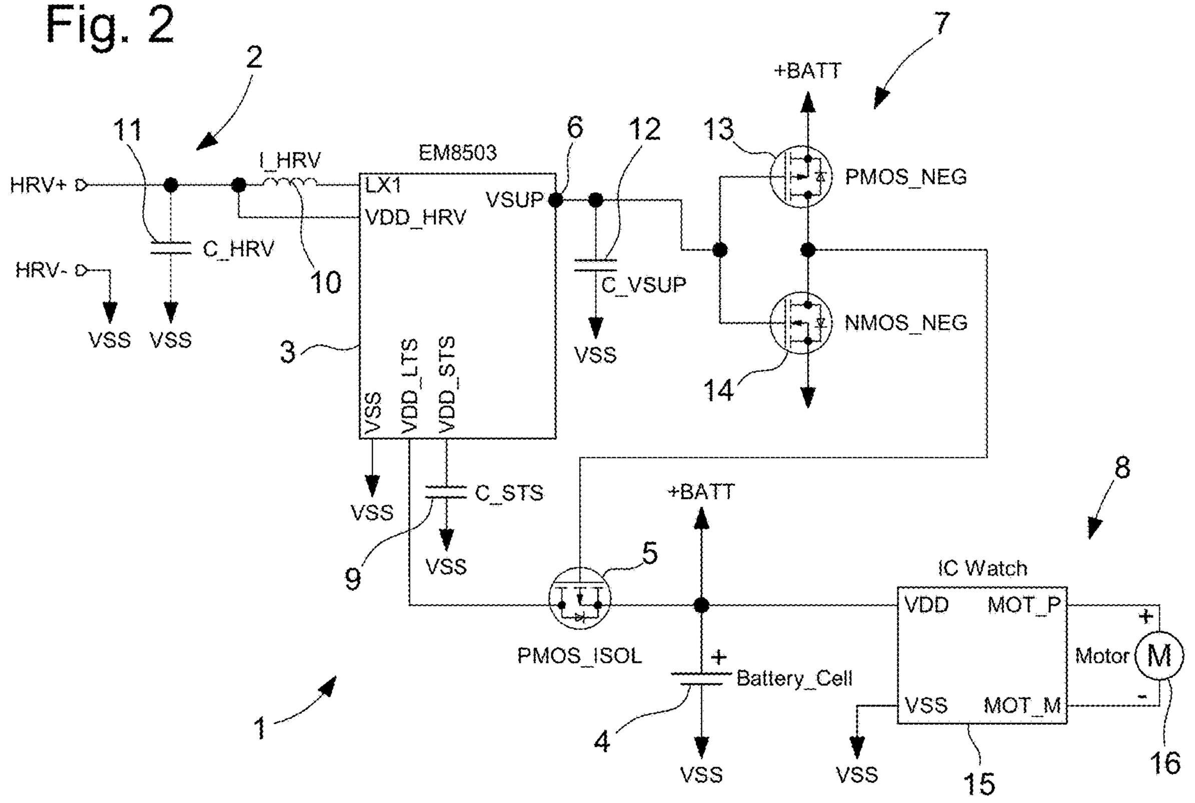
FIG. 2 is a circuit diagram showing an implementation example of the energy harvesting system shown in FIG. 1.

The control signal may be a digital or analogue signal. In the present description the word “signal” is to be understood broadly such that some information is typically encoded in the signal. In the example of FIG. 2, analogue signals are used. When the IC 3 is able to extract energy from the energy harvester 2, its first output node or terminal 6, referred to as VSUP in FIG. 2, is set to a high voltage value $V_{DD}$, and when it is unable to extract energy from the energy harvester, it is set to a low voltage value $V_{SS}$, which in this case is zero.

In the present example, the switch 5 is implemented as a transistor and more specifically as a p-type metal-oxide-semiconductor field-effect transistor. To close a p-MOSFET switch, a low voltage needs to be applied to the gate terminal of the PMOS transistor in such a way that the voltage between the gate and the source terminal is negative. A PMOS transistor operates by creating a conductive channel between the source and drain terminals when a low voltage (lower than the source voltage) is applied to its gate terminal. In this situation, the voltage difference ($V_{gs}$) between the gate and source is negative, which turns on the PMOS transistor and allows current to flow from the source to the drain. For this reason, the energy harvesting system 1 in this case also comprises a logic circuit 7, which can be an inverter circuit 7, also called a signal inverter, arranged between the IC 3 and the switch 5 to invert the control signal before the inverted control signal is applied to the switch.

FIG. 1 further shows a watch system 8, which may be understood to be part of the energy harvesting system 1, or alternatively it may be understood to be a system, which is not part of the energy harvesting system, but connected to it. The watch system forms the load of the energy harvesting system and it comprises the watch's electronic components that are powered by the accumulator. For this purpose, the watch system is connected to the accumulator as shown in FIG. 1. In particular, unlike in traditional energy harvesting systems, in this case the watch system 8 is directly connected to the accumulator such that the watch system is not connected to the accumulator through the IC 3.

FIG. 2 is a circuit diagram showing some example implementation details of the energy harvesting system 1 of FIG. 1. The energy harvesting system 1, and more specifically the IC 3, further comprises a reserve energy storage element 9, which in this example is a capacitor, referred to as a first capacitor. In this example the first capacitor is a short-term storage capacitor to temporarily store electrical energy. The purpose of the first capacitor is to help the IC 3 to power on autonomously when it is not connected to the accumulator 4. Thanks to the first capacitor 9, the IC thus has an internal capacity sufficiently sized to power itself autonomously over a short period. In other words, the IC is able power on autonomously by using only the energy provided by the energy harvester 2 and the first capacitor 9. Hence, the IC 3 is configured in a such a way that in the absence of energy from the energy harvester, it is self-powered during a sleep mode, and it is thus not using any energy from the accumulator 4. As soon as the IC 3 is powered on, the control signal representing the output voltage of the IC indicates that external energy has become available, and that the IC is operational to extract that energy from the energy harvester 2.

In the configuration of FIG. 2, the IC 3 is connected to a solar cell, which has two main nodes or terminals: positive (+) referred to as HRV+, and negative (−), referred to as HRV−. These terminals represent the electrical contacts of the solar cell, through which the generated electrical current flows. As is shown in FIG. 2, an inductor 10, also called a coil, is connected to the positive terminal of the solar cell. The inductor 10 is part of a voltage converter circuit, which in this case is a step-up circuit which is configured to increase the voltage level of the input signal. This is also commonly known as a boost converter or voltage booster. A step-up circuit is particularly useful in situations where a higher voltage is required than what is initially available. The inductor 10 forms the core of the step-up circuit such that when current flows through the inductor, it stores energy in its magnetic field.

It works in two phases; in a first phase, the energy from the input source is stored in the inductor in its magnetic field, while in a second phase, the magnetic field decreases and gradually transfers its energy to the element connected to the output. In this latter phase, a voltage drop across the inductance gets added to the input voltage, resulting in a higher output voltage.

The energy harvesting system 1 also comprises a second capacitor 11, which is also referred to as a first additional or supplementary energy storage element, and a third capacitor 12, which is also referred to as a second additional or supplementary energy storage element. In this example, the second capacitor is connected to the positive terminal of the solar cell (or the energy harvester more broadly), while the third capacitor is in this example connected to the output node 6 of the IC. The second and third capacitors are used in the present circuit to smooth out voltage fluctuations and thus to prevent too high voltages in the circuit.

In the present example, the inverter circuit 7 uses complementary metal-oxide-semiconductor (CMOS) technology. As shown in FIG. 2, a CMOS inverter consists of both a p-type metal-oxide-semiconductor (PMOS) transistor 13 and an n-type metal-oxide-semiconductor (NMOS) transistor 14. The use of both types of transistors allows for efficient signal conversion. The inverter circuit 7 is configured to invert the state or logic level of a signal to the opposite state or logic level. Thus, if a LOW signal is fed into the inverter circuit, it flips it to a HIGH signal. On the other hand, if a HIGH signal is fed into the inverter circuit, it flips it to a LOW signal.

As in the present example the watch is an electronic watch, and in particular a quartz watch, the watch system 8 comprises a watch system IC 15 and a motor 16. The accumulator 4 provides power to the watch system IC 15, which includes a quartz crystal oscillator. The watch system IC uses the quartz crystal's vibrations to precisely measure time and then sends signals to the motor 16 to drive the hands on the watch.

Figure 3:
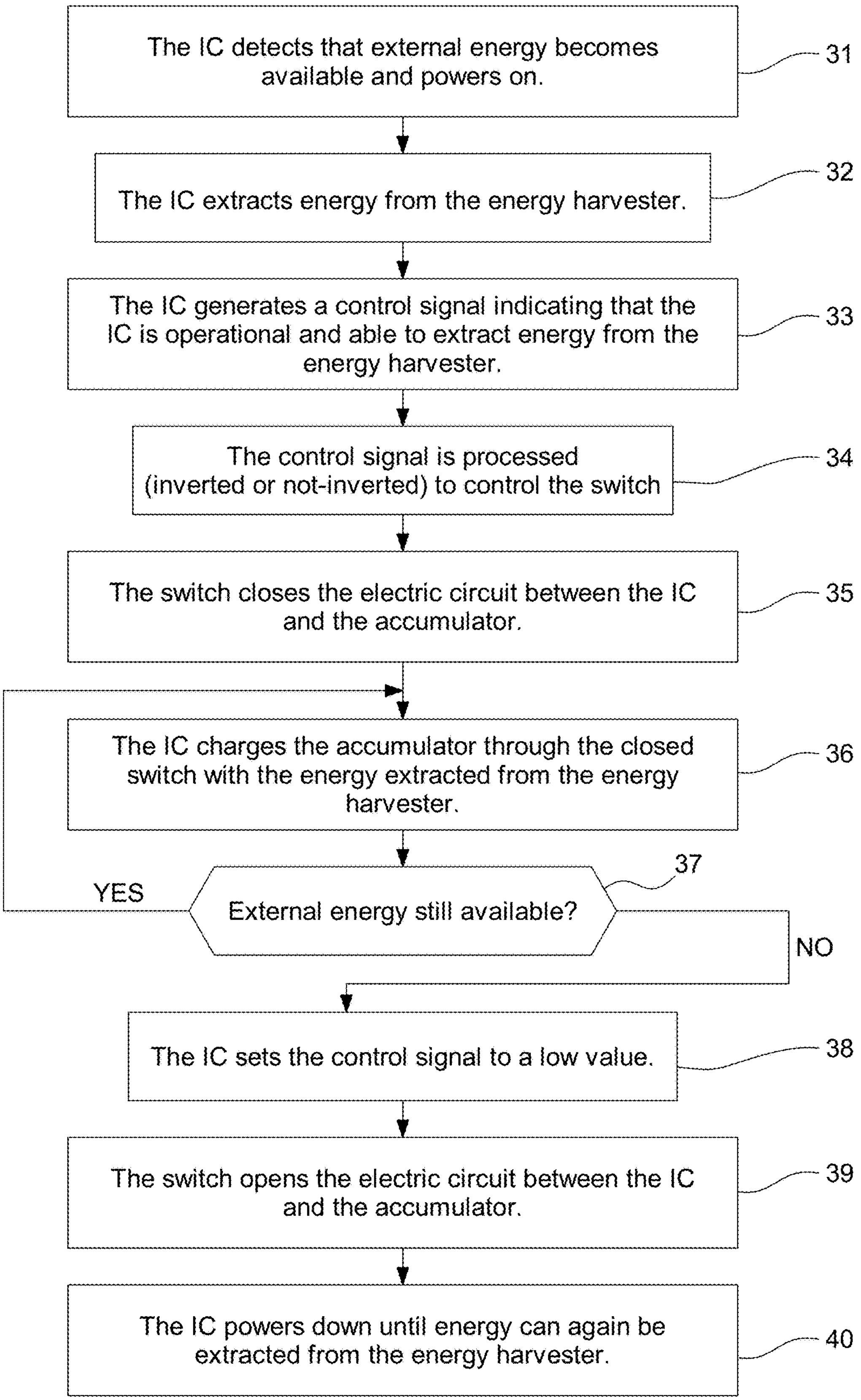
FIG. 3 is a flow chart illustrating the operation of the energy harvesting system of FIG. 1.

The flow chart of FIG. 3 summarises the operation of the energy harvesting system 1. In step 31, the IC 3 detects that external energy becomes available and it exits the sleep mode by powering on using the first capacitor 9 and the energy from the energy harvester 2. In step 32, the IC 3 starts extracting energy from the energy harvester 2. In step 33, the IC generates a control or energy signal, which in this example is a HIGH signal indicating that the IC is operational and able to extract energy from the energy harvester. In step 34, the control signal is processed (inverted or not-inverted) by the inverter circuit 7 to control the switch 5. More specifically, the inverter circuit inverts the control signal, which is then used to control the operation or electrical conductivity of the switch 5. Accordingly, in step 35, the switch closes as a result of the inverted control signal being applied to its gate terminal. In step 36, the IC charges the accumulator through the closed switch with the energy extracted from the energy harvester 2. In step 37, the IC 3 determines whether or not external energy is still available. In the affirmative, the process continues in step 36 by further charging the accumulator. If in step 37 it was determined that no external energy is any longer available, then in step 38, the IC 3 sets the control signal to a low value (a LOW signal) indicating that it is no longer able to extract energy from the energy harvester 2. In step 39, the switch opens as a result of the HIGH signal being applied to the gate terminal of the switch 5. In step 40, the IC powers down and enters the sleep mode until energy can again be extracted from the energy harvester 2. It is to be noted that in the above-described process, the order of steps 32 and 33 may be reversed, or these steps may be carried our simultaneously or substantially simultaneously.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A circuit arrangement (1) for extracting energy from an energy harvester (2), the circuit arrangement (1) comprising:

an integrated circuit (3) connected to the energy harvester (2) and configured to extract energy from the energy harvester (2);

an energy accumulator (4) configured to be connected to the integrated circuit (3) for receiving the energy extracted by the integrated circuit (3);

a switch (5) arranged between the integrated circuit (3) and the energy accumulator (4) to selectively disconnect the energy accumulator (4) from the integrated circuit (3), wherein the integrated circuit (3) is configured to output a control signal such that the control signal as inverted or non-inverted is configured to close the switch (5) when the integrated circuit (3) is able to extract energy from the energy harvester (2), and to open the switch (5) when the integrated circuit (3) is unable to extract energy from the energy harvester (2) to thereby disconnect the integrated circuit (3) from the energy accumulator (4), the switch (5) is directly connected electrically to a first electrical node of the circuit arrangement (1), a second electrical node of the circuit arrangement (1), and a third electrical node of the circuit arrangement (1), the integrated circuit (3) is directly connected electrically to the first electrical node and thereby directly to the switch (5), the energy accumulator (4) is directly connected electrically to the second electrical node and thereby directly to the switch (5), and the integrated circuit (3) is configured to output the control signal to the switch (5) via the third electrical node.

2. The circuit arrangement (1) according to claim 1, wherein the circuit arrangement (1) further comprises a load (8) powered by the energy accumulator (4) and connected to the energy accumulator (4) such that the load (8) is not connected to the energy accumulator (4) through the integrated circuit (3).

3. The circuit arrangement (1) according to claim 2, wherein the load (8) is directly connected to the accumulator (4).

4. The circuit arrangement (1) according to claim 2, wherein the load (8) comprises a watch system.

5. The circuit arrangement (1) according to claim 1, wherein the circuit arrangement (1) further comprises a logic circuit (7) arranged between the integrated circuit (3) and the switch (5) to process the control signal to be applied to the switch (5).

6. The circuit arrangement (1) according to claim 5, wherein the logic circuit is an inverter circuit (7) using a complementary metal-oxide-semiconductor circuit (13, 14).

7. The circuit arrangement (1) according to claim 1, wherein the switch (5) is a P-channel metal-oxide-semiconductor field-effect transistor.

8. The circuit arrangement (1) according to claim 1, wherein the integrated circuit (3) comprises, or is connected to a reserve energy storage element (9) to help power on the integrated circuit (3) after being powered off to be able to extract energy from the energy harvester (2).

9. The circuit arrangement (1) according to claim 8, wherein the reserve energy storage element (9) is a short-term storage capacitor.

10. The circuit arrangement (1) according to claim 1, wherein the integrated circuit (3) is unable to be powered by the energy accumulator (4) when the switch (5) is open.

11. The circuit arrangement (1) according to claim 1, wherein the circuit arrangement (1) further comprises a step-up circuit configured to increase the voltage level present at an output node of the energy harvester (2).

12. The circuit arrangement (1) to claim 1, wherein the control signal is characterised by a high signal value when the integrated circuit is able to extract energy from the energy harvester (2) and a low signal value when the integrated circuit (3) is unable to extract energy from the energy harvester (2).

13. The circuit arrangement (1) according to claim 1, wherein at least one of (a) and (b) of which:

(a) comprises the energy harvester (2) being at least one of the following: a solar cell, kinetic or mechanical energy harvester, a thermoelectric generator, a radio frequency harvester, and (b) comprises the energy accumulator (4) being any of a rechargeable battery and a supercapacitor.

14. The circuit arrangement (1) according to claim 1, wherein the integrated circuit (3) is electrically connected to the energy accumulator (4) only through the switch (5).

15. The circuit arrangement (1) according to claim 1, wherein the circuit arrangement (1) further comprises a fourth electrical node, the integrated circuit is directly connected electrically to the fourth electrical node and is configured to extract the energy from the energy harvester (2) via an inductor (10) at the fourth electrical node.

16. A method of operating a circuit arrangement (1) for extracting energy from an energy harvester (2), the circuit arrangement comprising an integrated circuit (3) connected to the energy harvester (2) and configured to extract energy from the energy harvester (2), an energy accumulator (4) connected to the integrated circuit (3) for receiving the energy extracted by the integrated circuit (3); and a switch (5) arranged between the integrated circuit (3) and the energy accumulator (4) to selectively disconnect the energy accumulator (4) from the integrated circuit (3), the method comprising the steps of:

powering (31) on the integrated circuit (3) without extracting energy from the energy accumulator (4) for the purpose of powering on the integrated circuit (3) as soon as energy can be extracted from the energy harvester (2);

the integrated circuit (3) extracting (32) energy from the energy harvester (2);

the integrated circuit (3) generating (33) a control signal for controlling the operation of the switch (5);

closing (35) the switch (5) when the control signal as inverted or non-inverted is applied to the switch (5), the control signal being indicative of the integrated circuit (3) being able to extract energy from the energy harvester (2); and the integrated circuit (3) charging (36) the energy accumulator (4) through the closed switch (5), wherein the switch (5) is directly connected electrically to a first electrical node of the circuit arrangement (1), a second electrical node of the circuit arrangement (1), and a third electrical node of the circuit arrangement (1), the integrated circuit (3) is directly connected electrically to the first electrical node and thereby directly to the switch (5), the energy accumulator (4) is directly connected electrically to the second electrical node and thereby directly to the switch (5), and the integrated circuit (3) is configured to output the control signal to the switch (5) via the third electrical node.

* * * * *